Patented Jan. 26, 1932

1,842,876

UNITED STATES PATENT OFFICE

ARTHUR J. MASON, OF HOMEWOOD, ILLINOIS

ART OF FERTILIZATION

No Drawing.    Application filed April 2, 1928.  Serial No. 266,874.

This invention relates to improvements in the art of fertilization and more especially in relation to the fertilization of tillable land.

Heretofore, in applying the element phosphorus as a plant food it has been the practice to mix the mineral bone phosphate of lime with sulphuric acid in almost equal quantities to give the well-known acid phosphate of commerce. This treatment renders the phosphoric acid soluble and available for plant food. When it has been desired to furnish potash in addition, the potash has been added by any well-known means.

Most land contains a quantity of potash in the upper soil; but ordinarily this potash is not soluble or available for plant food. For example, tillable land may contain as much as 10,000 pounds of potash per acre in the upper seven inches of soil which is not soluble or available for plant food.

I have found that if phosphorus in the form of phosphoric acid is applied to such soil containing potash, the acid combines with the potash already and naturally in the soil and renders it soluble and available for plant food. For example, I may apply phosphoric acid diluted with from 30 to 100 parts of water. I have found that 40 pounds of phosphoric acid sufficiently diluted to spread the same over one acre will render the potash therein soluble and available for plant food.

By the recitation of "free phosphoric acid" in the claims, I intend to distinguish from the former practice of incidental application of small percentages of phosphoric acid carried by acid phosphates or "super phosphates" as they are popularly designated. In other words, free phosphoric acid as recited in the claims is intended to signify not only uncombined acid but phosphoric acid free from mixture with substantial proportions of phosphatic compounds.

While I have shown and described a certain method of practicing my invention, it is to be understood that it is capable of many modifications. Changes, therefore, in the method and practice may be made without departing from the spirit and scope of the invention as disclosed in the appended claims, in which it is my intention to claim all novelty in my invention as broadly as possible in view of the prior art.

What I claim as new, and desire to secure by Letters Patent, is:

1. In the art of fertilization of soil containing natural insoluble potassium compounds, the process of applying free phosphoric acid thereto in sufficient quantities to break down said compounds and form soluble potassium salts without leaving a harmful amount of free acid.

2. In the art of fertilization of soil containing natural insoluble potassium compounds, the process of applying an aqueous solution of free phosphoric acid thereto in sufficient quantity to break down said compounds and form soluble potassium salts without leaving a harmful amount of free acid in the soil.

In witness whereof, I have hereunto set my hand this 28th day of March, 1928.

ARTHUR J. MASON.